July 23, 1929.  W. A. KNOOP  1,722,050
PRINTING TELEGRAPH SYSTEM
Filed July 19, 1927
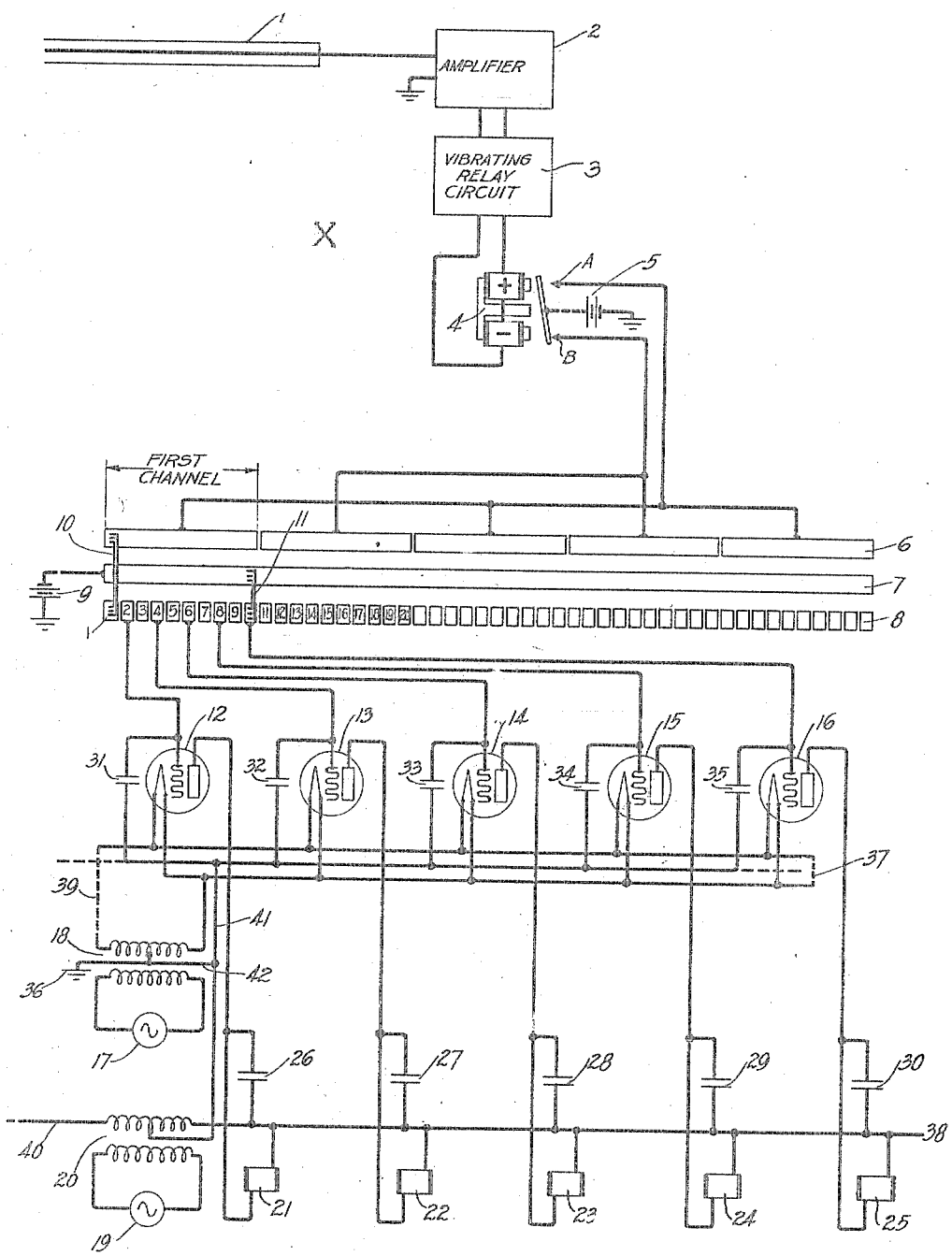
INVENTOR
WILLIAM A. KNOOP
BY J. W. Schmied
ATTORNEY Patented July 23, 1929.

1,722,050

UNITED STATES PATENT OFFICE.

WILLIAM A. KNOOP, OF HEMPSTEAD, NEW YORK, ASSIGNOR TO WESTERN ELECTRIC COMPANY, INCORPORATED, OF NEW YORK, N. Y., A CORPORATION OF NEW YORK.

PRINTING-TELEGRAPH SYSTEM.

Application filed July 19, 1927. Serial No. 206,813.

This invention relates to transmission systems and more particularly to high speed printing telegraph systems employing long lines such as submarine cables and the like.

An object of the invention is to insure the operation of printer magnets in response to signals transmitted over a long line adapted for high speed transmission.

A more specific object of the invention is to lengthen transmitted signal impulses at the receiving station sufficiently to operate the printer magnets without impairing the high speed efficiency of a loaded submarine cable.

In certain types of telegraph systems, particularly the systems adapted for the high speed transmission, means have been employed intermediate the transmitting apparatus and the line or cable, for relaying the transmitted signals to the line or cable, such means being capable of regulating the amount and duration of current entering the line or cable at each signal impulse without imposing any limitations on the speed at which the telegraph signals are transmitted. These means comprise a three-electrode electric discharge device, such as the well known audion or thermionic relay, operating by pure electron discharge, or similar three-element tube operating with ionized gas, and an electrostatic element, such as a condenser, connected in the input circuit of the discharge device and designed to be charged in accordance with the actuation of suitable transmitting apparatus. When the condenser possesses a charge, a potential will be applied to the grid electrode of the electric discharge device, which is of sufficient value to allow current to flow in the plate circuit, thereby applying a definite transmitting potential to the line or cable. Since the input circuit of the discharge device is of an extremely high resistance, the condenser will discharge very slowly, thereby maintaining a flow of current in the line as long as the condenser retains a charge.

According to the present invention, the signal impulses are lengthened at the receiving station to allow the use of a relatively cheap, slow-speed printer selector magnet. Each impulse is lengthened by a three-electrode electric discharge device which is connected between each of the printing segments of a distributor and the corresponding printer selector magnets. The grid electrodes of the electric discharge devices are connected directly to the printing segments, and the printer magnets are inserted in the plate circuits. The impulses are further lengthened by a condenser connected to the grid of each electric discharge device. This condenser serves to store charges similar to those on the grids and to retain the charges on the grids until the corresponding printer selector magnets have had sufficient time to operate. In attaining the object of this invention, a high speed printer relay is arranged at the receiving station to respond to incoming signal impulses which in a high speed system, are of very short duration, and to thereby connect or disconnect positive battery to alternate segments of a ring on a rotary distributor. This ring is divided into long segments corresponding in number to the channels employed in the system and is connected by means of a rotatable brush to a second ring which is likewise divided into segments but of considerably shorter lengths. The second ring is provided with ten segments for each channel, the alternate segments of which are connected to the grids and their associated condensers. The second ring is connected by means of a second rotatable brush, referred to herein as a restore brush, to a third ring which is connected to negative battery, so that negative potential will normally be applied to the grids and the condensers. The restore brush rotates in advance of the printer brush and should there be a positive charge remaining on any of the grid condensers from a previous signal impulse, it will be discharged thereby restoring to normal the printer magnet maintained operated by the positive charge. In this manner the positive operation and positive release of the printer magnets is assured.

A better understanding of the invention may be had from the following detailed description, when considered in conjunction with the accompanying drawing of a receiving distributor for printing telegraph in which five vacuum tubes are shown connected between five printer segments of a channel and the five corresponding printer magnets.

Referring to the drawing a preferred embodiment of the invention is shown in connection with a submarine cable system in which station X is connected to a distant station (not shown) by means of a submarine cable 1. The stations are each provided with special rotary distributors which are arranged to rotate in synchronism in accordance with practice well known in the art. Of the distributor at station X only the receiving section is shown and this section is shown developed for the sake of clearness. Cable 1 is shown terminating in the input circuit of a space discharge or other type of amplifier 2. To the output circuit of the amplifier there is connected through a vibrating relay circuit 3 of the type disclosed in U. S. Patent 1,680,550, granted to M. B. Kerr on Aug. 14, 1928, a high speed printer relay 4 which is arranged to respond to the amplified incoming signals and also the signals furnished by the vibrating relay circuit to take the place of those which are lost in transmission over the cable. Relay 4 is of the unbiased polarized type and is designed to be responsive to impulses of both positive and negative polarity, the relay armature being arranged to remain in engagement with either of its associated contacts until an impulse of the polarity opposite to that which last actuated it, is received by the relay. The armature of relay 4 is connected to the positive pole of grounded battery 5 and its associated contacts are respectively connected to two groups of alternate segments of a ring 6 of the receiving section of the distributor. The distributor has in its receiving section three parallel rings, 6, 7 and 8. Ring 6 consists of segments corresponding in number to the number of channels provided for transmission, one segment being provided for each channel; ring 7 is a continuous member and is connected to the negative side of battery 9, the purpose of which will be hereinafter explained; and ring 8 consists of groups of 10 segments each, one group being provided for each channel for the purpose of receiving the impulses thereof. Rings 6 and 8 are interconnected by a rotatable brush 10 and rings 7 and 8 are interconnected by a rotatable brush 11, the latter brush being arranged to rotate from left to right in advance of the former brush. Of ring 8 the segments for the first channel only are shown connected for operation and those designated by even numbers are respectively connected to the grids of a series of three-electrode vacuum tubes 12, 13, 14, 15 and 16, while the odd numbered segments are left "dead" in order to permit of some phase wander of the distributor brushes with respect to incoming signals. The filaments of the vacuum tubes are furnished with alternating current from a common source 17 through transformer 18, and the plate circuits are likewise furnished with alternating current, but from a second source 19 through transformer 20. It is understood, of course, that direct current may be furnished instead of the alternating current, in which event, the transformers will be eliminated. but inasmuch as each channel requires five vacuum tubes and there may be several channels provided, the alternating current is preferable. Respectively included in the plate circuits of the tubes 12, 13, 14, 15 and 16 are printer magnets 21, 22, 23, 24 and 25 and condensers 26, 27, 28, 29 and 30, the condensers being necessary only in cases where alternating current is used in the filament and plate circuits. Respectively connected in the input circuits of the vacuum tubes and arranged in parallel with the grids thereof, are condensers 31, 32, 33, 34 and 35 which are arranged to receive charges simultaneously with their respectively associated grids and to prolong the charges on the grids after the respective grid circuits have been opened.

The arrangement of the vacuum tubes shown for the first channel together with their respectively associated condensers and printer magnets, is identical with the arrangement required in the remaining channels, the filaments of the vacuum tubes of both the odd and even numbered channels being connected to transformer 18 at points 37 and 39. The plate circuits of the vacuum tubes are connected to transformer 20, the even numbered channels being connected at point 38 and the odd numbered channels being connected at point 40.

When the distributors are operating in proper phase and no message signals are on the cable, spacing signals only are received in relay 4 the polarity of the latter signals reversing at the beginning of each channel in order to effect a substantial balance of polarities and provide reversals for correction. In a four-channel system this balance would be perfect because the spacing signals in the first and third channels are of one polarity and those in the second and fourth are of the other polarity, but in a five channel system there would be a fifth channel and the spacing signals thereof would be of the same polarity as that of the first and third channels, thereby causing a preponderance of one polarity over the other polarity. This preponderance of polarity is corrected somewhat and a substantial balance obtained by a method disclosed in U. S. Patent No. 1,695,040 granted to A. A. Clokey on Dec. 11, 1928. In order to avoid unnecessary discussion of the method for obtaining a satisfactory balance in a five-channel ystem, it is assumed for the purpose of describing the operation of the invention in a clear and simple manner, that the system comprises four channels and that the spacing signals received in relay 4 are positive in the first and third channels and negative in the second and fourth channels, it being understood of course that the marking signals in each channel are opposite in polarity to the spacing signals.

When message signals are on the cable combinations of spacing and marking signals are respectively received in the various channels in the order of the positions of the corresponding segments on the receiving ring 6 of the distributor. Each combination consists of five impulses and is effective to energize the windings of relay 4 a corresponding number of times. Relay 4 is of the so-called two-position type in which the armature remains against either of its associated contacts A and B until the current of the signal impulses reverses. It will be noted that contact A is connected in multiple to the first and third segments of ring 6 and contact B is similarly connected to the second and fourth segments. Assuming that the distributor at X is in synchronism and phase with the distributor at the distant office, and that the message is being received in the first channel, the spacing signals which are of positive polarity would cause the armature to engage contact B, but contact B is not connected to the first channel segment of ring 6 and therefore the spacing signals would cause a charge to be impressed on any of the storing grids and condensers. But should a marking signal, which would be a negative impulse in this case, be received, the armature would engage contact A, and inasmuch as this contact is connected to the first channel segment of ring 6 a circuit will be closed as brush 10 makes contact with the even numbered segment of ring 8 corresponding in position in the channel to the impulse which actuated the armature to produce a positive impulse as will be hereinafter explained. In a similar manner the marking signals in the remaining channels are repeated as positive impulses although these signals as received over the cable are positive in the second and fourth channels and negative in the first and third channels.

The operation of the arrangement shown for the first channel will now be described and this description will suffice for the remaining channels. For this purpose an arbitrary combination of signals received over the first channel will be selected. Assuming that the combination selected consists of impulses conventionally stated as − + − − +, relay 4 in response to the first impulse which in this case happens to be a marking signal, causes its armature to engage contact A and as brush 10 makes contact with segment 2 of ring 8, a positive charge from battery 5 is impressed on the grid of vacuum tube 12 and condenser 31 in a circuit having parallel paths extending to ground connection 36 as shown in the drawing. The positive charge on the grid ordinarily allows sufficient space current to flow in the plate circuit to operate selector magnet 21, and as brush 10 passes off segment 2 the circuit closed by brush 10, is opened, but the charge on condenser 31 begins to discharge slowly through vacuum tube 12 and thereby maintains the grid positive with respect to its associated filament so that the space current is prolonged sufficiently to insure the operation of the magnet. The second impulse of the combination which is positive, is a spacing signal in this channel and causes the armature of relay 4 to engage contact B, whereof no charge is impressed on the grid of tube 13 when brush 10 reaches segment 4 of ring 6. The third and fourth impulses of the combination are both negative and cause the armature to move back to contact A and remain there for the duration of the two impulses. As brush 10 engages segments 6 and 8 in succession, positive charges are successively impressed on the grids of tubes 14 and 15 and their respectively associated condensers 33 and 34, and selector magnets 23 and 24 operate in a manner similar to that described for magnet 21. The fifth impulse is positive which causes the relay armature to engage contact B and thereby opens a circuit extending through the first channel segment of ring 6 and the segment 10 of ring 8. Therefore no charge is impressed on the grid of tube 16 and the magnet 25 remains normal. The magnets 21, 23 and 24 are therefore operated in response to the marking signals of the above combination and may remain in this condition because of the charges retained on their respectively associated condensers 31, 33 and 34, even after the character, or letter, corresponding to the combination, has been set up mechanically by the printer (not shown) and brush 10 has passed on to the segments of the second channel.

A restore brush 11 which rotates in advance of brush 10 serves to momentarily connect ring 7 with each of segments 2, 4, 6, 8, 10 of ring 8 in succession and thereby a negative battery 9 which is connected to ring 7 causes a negative charge to be impressed on each of the condensers 31, 32, 33, 34 and 35. Should any of the condensers still retain a portion of a positive charge stored by the preceding combination of signal impulses, the connection of negative battery 9 through brush 11 will effect the complete discharge and restore the condensers to their normal condition. The potential normally applied to the plates of the tubes through transformers 18 and 20 is such that with a negative potential on the grids, insufficient space current flows in the plate circuits to allow the magnets to remain operated and therefore magnets 21, 23 and 24 release. The printer then restores the mechanism which has been set up by the printer magnets in readiness for a new combination.

Since the input circuits of the vacuum tubes are of extremely high resistance, the condensers which are connected in shunt thereto and arranged to discharge therethrough, will discharge very slowly thereby allowing the marking signals to be lengthened over periods of considerable duration. In this manner relatively cheap slow-speed printer magnets may be employed without impairing high speed transmission.

What is claimed is:

1. In a transmission system, a line, apparatus for increasing the effective length of signal impulses, said apparatus comprising a potential controlled receiving device, such as a vacuum tube relay, and a condenser, said condenser being permanently connected to said receiving device and intermittently connected to said line.

2. In a transmission system, apparatus for increasing the effective length of signal impulses comprising a distributor, a brush and segments on said distributor, a condenser connected intermittently to said segments, and a vacuum tube relay having its input electrode connected to said condenser, whereby the output current of said relay attains a required value when the brush engages a segment, and remains at said required value until the distributor brush engages its next segment.

3. In a transmission system, means responsive to impulses of short duration, slow acting devices, and thermionic and capacity elements respectively co-acting therewith for lengthening said impulses sufficiently to operate said devices.

4. In a transmission system, means responsive to impulses of short duration recurring in rapid succession, slow acting devices, thermionic devices for lengthening said impulses sufficiently to operate said slow acting devices without affecting said responsive means and other means for increasing the duration of said lengthened impulses to insure the operation of said slow acting devices.

5. In a transmission system, means responsive to short impulses of one polarity recurring in rapid succession, means for repeating said impulses as impulses of another polarity, slow acting devices, thermionic devices for lengthening said repeated impulses sufficiently to respectively operate said slow acting devices without affecting said responsive means and other means connected in parallel with said thermionic devices for increasing the duration of said lengthened impulses to insure the operation of said slow acting devices.

6. In a transmission system, means responsive to short impulses of one polarity recurring in rapid succession, means for repeating said impulses as impulses of another polarity, slow acting devices, electron discharge devices for lengthening said repeated impulses sufficiently to operate said slow acting devices without affecting said responsive means, and means coacting with said electron discharge devices for restoring said slow acting devices to normal immediately after they operate.

7. In a transmission system, a line, apparatus for receiving from said line impulses of short duration recurring in rapid succession, slow acting devices, and electron discharge devices for lengthening said impulses sufficiently to operate said slow acting devices without affecting the reception of impulses of short duration.

8. In a transmission system, a cable adapted for high speed transmission, apparatus for receiving impulses from said cable, slow acting devices, and thermionic electrostatic means for lengthening said impulses sufficiently to operate said devices in succession without affecting the high speed transmission.

9. In a transmission system, apparatus for receiving high speed signals, slow acting devices, thermionic electrostatic means for lengthening said high speed signals sufficiently to operate said devices without affecting the high speed transmission, and other electrostatic means for increasing the duration of said lengthened impulses to insure the operation of said devices.

10. In an impulse receiving system, slow acting magnets, a vacuum tube device having its grid-cathode circuit connected to a circuit from which impulses are received and its anode-cathode circuit operatively connected to said magnets, and a condenser connected in shunt to said grid-cathode circuit, said condenser being of capacity suitable to cause the production of impulses lengthened with respect to the received impulses for operating said magnets in said anode-cathode circuit.

11. In a transmission system, apparatus for receiving high speed signals, slow acting recording devices, thermionic means for lengthening said high speed signals sufficiently to operate said recording devices without affecting the high speed transmission, and other means arranged to cooperate with said thermionic means for increasing the duration of said lengthened impulses to insure the operation of said devices.

12. In a transmission system, a loaded cable adapted for high speed signaling, apparatus for receiving signals from said cable, slow acting recording devices, and thermionic means and electrostatic means cooperating therewith for lengthening said high speed signals sufficiently to operate said recording devices without affecting the high speed transmission.

13. In a transmission system, a loaded cable adapted for high speed signaling, apparatus for receiving from said cable high speed signals of one polarity and repeating said signals as signals of another polarity, slow acting devices responsive to said repeated signals, and means comprising thermionic and capacity elements for lengthening said repeated signals sufficiently to operate said devices without affecting the high speed signaling.

14. In a transmission system, a loaded cable, apparatus comprising means for receiving from said cable high speed signals of opposite polarities and repeating certain of said signals, of both polarities as signals of only one polarity, slow acting devices responsive to said repeated signals, and means comprising thermionic and capacity elements for lengthening said repeated signals sufficiently to operate said devices.

15. In a transmission system, a loaded cable, recording apparatus comprising a high speed relay responsive to signals of opposite polarities incoming from said cable, contacts and armature on said relay arranged to repeat certain of said incoming signals of opposite polarities as signals of one polarity, slow acting devices responsive to signals of only one polarity, and an electron discharge device and a condenser co-acting therewith for lengthening said repeated signals sufficiently to operate said devices.

16. In a transmission system, apparatus comprising means for receiving high speed signals, means for distributing certain of said signals over a plurality of channels, slow acting recording devices in each of said channels, and separate thermionic means and condensers co-acting respectively therewith for lengthening said certain signals in each channel, said means being capable of lengthening the signals sufficiently to operate the recording devices in their respective channels without affecting high speed transmission.

17. In a transmission system, a loaded cable, apparatus comprising means for receiving from said cable high speed signals of opposite polarities and repeating certain of said signals of both polarities as signals of only one polarity, means for distributing the repeated signals over a plurality of channels, slow acting recording devices in each of said channels comprising electron discharge devices and condensers respectively co-acting therewith, and means individual to said channels for lengthening said high speed repeated signals sufficiently to operate their respectively associated recording devices without affecting high speed transmission.

18. In a transmission system, a loaded cable, receiving apparatus comprising a high speed relay responsive to signals of opposite polarities incoming from said cable, contacts and armature of said relay arranged to repeat said incoming signals as signals of one polarity, means for distributing the repeated signals over a plurality of channels, slow acting recording devices in each of said channels responsive to signals of only one polarity, and electron discharge devices and condensers respectively arranged in parallel therewith in each of said channels for lengthening said repeated signals sufficiently to operate the slow acting devices in their respective channels without affecting the speed of transmission.

19. In a transmission system, apparatus comprising means responsive to high speed current impulses of opposite polarities and arranged to repeat certain of said impulses as impulses of one polarity, electron-discharge devices each comprising a filament, a grid, and a plate electrode arranged to receive and lengthen said repeated impulses, a slow acting recording device connected in the plate circuit of each of said electron discharge devices, and arranged to respond to impulses of one polarity only, means for successively applying to the grids of each of said electron discharge devices after the recording devices respectively connected to said discharge devices, have operated, an impulse of the opposite polarity to effect the discharge of the grids and the release of the recording devices.

20. In a transmission system, apparatus comprising a relay responsive to high speed current impulses of opposite polarities, contacts and armature of said relay arranged to repeat certain of said impulses as impulses of positive polarity, electron discharge devices arranged to receive and lengthen said repeated impulses, each of said devices comprising a filament, a grid and a plate electrode, a condenser connected in parallel with each of said grids for further lengthening of said repeated signals, a slow acting recording device connected in circuit to each plate electrode and arranged to respond to said repeated signals, and means for applying an impulse of negative polarity to each of said grids to discharge any positive charge thereon and to thereby effect the release of the associated recording devices.

21. In a transmission system, a relay responsive to current impulses of positive polarities, armature and contacts on said relay, a source of potential connected to said armature for repeating certain of said impulses as impulses of one polarity, a rotary distributor for repeating said repeated signals over a plurality of channels, a ring on said distributor comprising a plurality of segments corresponding to the number of channels employed, said segments being arranged in two groups of alternate segments, one group being connected to one of said contacts and another group being connected to the other of said contacts, a second ring on said distributor comprising a plurality of segments arranged in groups corresponding in number to the number of channels employed, a rotatable brush for successively connecting the segments of said second ring with those of said first ring, and a plurality of recording devices in each of said channels for recording repeated impulses, said devices being respectively responsive to the repeated impulses in their respective channels.

22. In a transmission system, apparatus for receiving high speed signals of opposite polarities and repeating certain of said impulses as impulses of positive polarity, a distributor for distributing the repeated impulses over a plurality of channels, said distributor comprising a set of three rings, one of said rings divided into segments corresponding in number to the number of channels employed, another divided into a plurality of segments arranged in groups corresponding in number to the number of segments of the first mentioned ring and the other is continuous, the repeated impulses impressed on the distributor through the segments of the first mentioned ring, electron discharge devices each comprising a filament, a grid and a plate electrode and connected respectively to the segments of the second mentioned ring, a rotatable brush interconnecting the first and second mentioned rings to allow the repeated impulses of positive polarity to be successively impressed on said grids, and a slow acting recording device in circuit with each of said plate electrodes, the space current between the electrodes of each of said discharge devices being effective to lengthen said repeated impulses of positive polarity sufficiently to operate said recording device.

In witness whereof, I hereunto subscribe my name this 18th day of July A. D., 1927.

WILLIAM A. KNOOP.